US007167352B2

(12) United States Patent
Matsuoka et al.

(10) Patent No.: US 7,167,352 B2

(45) Date of Patent: Jan. 23, 2007

(54) MULTILAYER CHIP VARISTOR

(75) Inventors: Dai Matsuoka, Akita (JP); Katsunari Moriai, Akita (JP); Takehiko Abe, Akita (JP); Koichi Ishii, Akita (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/137,584

(22) Filed: May 26, 2005

(65) Prior Publication Data

US 2005/0276001 A1 Dec. 15, 2005

(30) Foreign Application Priority Data

Jun. 10, 2004 (JP) ........................... P2004-173050
Jun. 10, 2004 (JP) ........................... P2004-173055

(51) Int. Cl.
*H01G 4/228* (2006.01)

(52) U.S. Cl. .............................. 361/306.1; 361/306.3; 361/311; 361/313; 338/20; 338/21

(58) Field of Classification Search ............ 361/306.1, 361/306.3, 311–313, 302–305; 338/20–21, 338/332, 262
See application file for complete search history.

(56) References Cited

U.S. PATENT DOCUMENTS 4,918,421 A * 4/1990 Lawless et al. ............... 338/21
5,119,062 A * 6/1992 Nakamura et al. ............ 338/20
5,369,390 A * 11/1994 Lin et al. ....................... 338/21
5,610,570 A * 3/1997 Yamada et al. ............... 338/20
5,963,416 A * 10/1999 Honda et al. ............ 361/306.1
5,994,995 A * 11/1999 Ogasawara et al. ........... 338/21
6,087,923 A * 7/2000 Ahn et al. ..................... 338/21
6,339,367 B1 * 1/2002 Takehana ..................... 338/20
6,400,254 B1 * 6/2002 Yamamoto et al. .......... 340/5.6

FOREIGN PATENT DOCUMENTS

JP A 9-320887 12/1997
JP A 11-233309 8/1999
JP A 11-265805 9/1999
JP A 11-307312 11/1999
JP 2004172369 A * 6/2006

* cited by examiner

*Primary Examiner*—Nguyen T. Ha
(74) *Attorney, Agent, or Firm*—Oliff & Berridge, PLC

(57) ABSTRACT

A multilayer chip varistor comprises a multilayer body and a pair of external electrodes formed on the multilayer body. The multilayer body has a varistor section and a pair of outer layer sections disposed so as to interpose said varistor section. The varistor section comprises a varistor layer developing a voltage nonlinear characteristic and a pair of internal electrodes disposed so as to interpose the varistor layer. The pair of external electrodes are connected to respective electrodes of the pair of internal electrodes. The relative dielectric constant of the outer layer sections is set lower than the relative dielectric constant of the region where the pair of internal electrodes in the varistor layer overlap each other.

4 Claims, 4 Drawing Sheets

Fig.4

| | AMOUNT OF Co ADDED (mol%) | AMOUNT OF Pr ADDED (mol%) | ADHESION OF $Li_2CO_3$ ($\mu$/unit) | SURFACE AREA OF OVERLAPPING SECTIONS OF INTERNAL ELECTRODES ($mm^2$) | $\varepsilon A$ | $\varepsilon B$ | $\varepsilon A/\varepsilon B$ | NONLINEAR COEFFICIENT $\alpha$ | ELECTROSTATIC CAPACITANCE C (pF) | | ESD RESISTANCE (kV) | |
|---|---|---|---|---|---|---|---|---|---|---|---|---|
| WORKING EXAMPLE 1 | 0. 05 | 0. 5 | 1 | 0. 05 | 652 | 99 | 6. 6 | 20 | 1. 2 | ○ | 20 | ○ |
| WORKING EXAMPLE 2 | 0. 01 | 0. 5 | 1 | 0. 05 | 670 | 52 | 12. 9 | 23 | 1. 1 | ○ | 20 | ○ |
| WORKING EXAMPLE 3 | 0 | 0. 5 | 1 | 0. 05 | 690 | 28 | 24. 6 | 22 | 0. 8 | ○ | 20 | ○ |
| WORKING EXAMPLE 4 | 0. 05 | 0. 05 | 1 | 0. 05 | 640 | 98 | 6. 5 | 23 | 1. 1 | ○ | 20 | ○ |
| WORKING EXAMPLE 5 | 0. 05 | 0. 01 | 1 | 0. 05 | 640 | 71 | 9. 0 | 21 | 0. 9 | ○ | 20 | ○ |
| WORKING EXAMPLE 6 | 0. 05 | 0. 005 | 1 | 0. 05 | 645 | 50 | 12. 9 | 22 | 0. 9 | ○ | 20 | ○ |
| WORKING EXAMPLE 7 | 0. 05 | 0 | 1 | 0. 05 | 645 | 25 | 25. 8 | 20 | 0. 8 | ○ | 20 | ○ |
| WORKING EXAMPLE 8 | 0 | 0 | 1 | 0. 05 | 650 | 20 | 32. 5 | 20 | 0. 7 | ○ | 20 | ○ |
| COMPARATIVE EXAMPLE 1 | 1. 5 | 0. 5 | 0 | 0. 05 | 650 | 590 | 1. 1 | 25 | 3. 3 | × | 20 | ○ |
| COMPARATIVE EXAMPLE 2 | 1. 5 | 0. 5 | 0 | 0. 025 | 650 | 590 | 1. 1 | 24 | 1. 8 | ○ | 5 | × |
| COMPARATIVE EXAMPLE 3 | 1. 5 | 0. 5 | 1 | 0. 05 | 645 | 460 | 1. 4 | 21 | 2. 8 | × | 20 | ○ |

MULTILAYER CHIP VARISTOR

BACKGROUND OF THE INVENTION

1. Field of the Invention

The present invention relates to a multilayer chip varistor.

2. Related Background Art

An example of the known multilayer chip varistor of this type comprises a multilayer body comprising a varistor section and a pair of outer layer sections disposed so as to interpose the varistor section and a pair of external electrodes formed on the multilayer body (see, for example, Japanese Patent Application Laid-open No. H11-265805). The multilayer body has a varistor section comprising a varistor layer developing a voltage nonlinear characteristic (referred to hereinbelow as "varistor characteristic") and a pair of internal electrodes disposed so as to interpose the varistor layer and a pair of outer layer sections disposed so as to interpose the varistor section. The external electrodes are connected to the respective internal electrodes. In the multilayer chip varistor described in Japanese Patent Application Laid-open No. H11-265805, the outer layer section is composed of the same material as the varistor layer.

SUMMARY OF THE INVENTION

An object of the present invention is to provide a multilayer chip varistor capable of reducing an electrostatic capacitance, while maintaining good resistance to ESD (Electrostatic Discharge).

In the recently developed high-speed interfaces, the structure of the IC itself has a low resistance to ESD to realize a higher speed. For this reason, a demand has grown for measures against ESD in the IC of high-speed transmission systems, and multilayer chip varistors have been used as ESD countermeasure components. Decrease in electrostatic capacitance is a mandatory condition that should be satisfied by a multilayer chip varistor as an ESD countermeasure component for high-speed transmission systems. If the developed electrostatic capacitance is high, problems are associated with signal quality and in the worst case the communication might be impossible.

Reducing the surface area of the portion where the internal electrodes overlap each other is considered as a measure for decreasing the electrostatic capacitance of multilayer chip varistors. When the surface area of the portion where the internal electrodes overlap each other is reduced, the region where the electrostatic capacitance is developed is also reduced and the electrostatic capacitance is decreased. However, if the surface area of the portion where the internal electrodes overlap each other is reduced, a novel problem of decreased the resistance to ESD (referred to hereinbelow as "ESD resistance") is created. When a surge voltage such as an ESD is applied, the electric field distribution in the portion where the internal electrodes overlap each other is such that the electric field concentrates in the end zones of the portion where the internal electrodes overlap each other. If the electric field concentrates in the end zones of the portion where the internal electrodes overlap each other, the ESD resistance rapidly decreases with the reduction in the surface area of the portion where the internal electrodes overlap each other.

Accordingly, the inventors have conducted a comprehensive study of multilayer chip varistors that enable the decrease in electrostatic capacitance, while maintaining good ESD resistance. The results revealed the following facts.

The electrostatic capacitance $C_{total}$ of the varistor, as represented by Formula (1) below, includes not only the electrostatic capacitance $C_1$ in the varistor characteristic development region, but also the electrostatic capacitance $C_2$ in the region outside the varistor characteristic development region.

$$C_{total}=C_1+C_2 \quad (1)$$

$C_1$: electrostatic capacitance in the region (referred to hereinbelow as "varistor characteristic development region") of overlapping in a pair of internal electrodes in the varistor layer $C_2$: electrostatic capacitance in the region outside the varistor characteristic development region The relative dielectric constant of the varistor characteristic development region is generated because the potential formed on crystal grain boundaries behaves as a capacitor and is usually of an order of several hundreds. For this reason, when the region outside the varistor characteristic development region is composed of the same material as the varistor characteristic development region, the relative dielectric constant of the region outside the varistor characteristic development region cannot be ignored when the reduction in electrostatic capacitance of the multilayer chip varistor is planned. Thus, if it is possible to decrease the relative dielectric constant of the region outside the varistor characteristic development region, then the electrostatic capacitance $C_2$ of the region outside the varistor characteristic development region will decrease and the electrostatic capacitance $C_{total}$ of the varistor can be reduced.

Based on the results of the study, the present invention provides a multilayer chip varistor comprising a multilayer body having a varistor section comprising a varistor layer developing a voltage nonlinear characteristic and a pair of internal electrodes disposed so as to interpose the varistor layer and a pair of outer layer sections disposed so as to interpose the varistor section, and a pair of external electrodes formed on the multilayer body and connected to respective electrodes of the pair of internal electrodes, wherein the relative dielectric constant of the outer layer sections is set lower than the relative dielectric constant of the region where the pair of internal electrodes in the varistor layer overlap each other.

In the multilayer chip varistor in accordance with the present invention, the relative dielectric constant of the outer layer sections is set lower than the relative dielectric constant of the region where the pair of internal electrodes in the varistor layer overlap each other. Therefore, the electrostatic capacitance of the outer layer sections becomes lower than the electrostatic capacitance of the region where the pair of internal electrodes in the varistor layer overlap each other. As a result, the electrostatic capacitance of the multilayer chip varistor can be reduced. Because the surface area of the portion where the internal electrodes overlap each other is set with consideration for ESD resistance, good ESD resistance can be maintained.

It is preferred that the region where the pair of internal electrodes in the varistor layer overlap each other have a region comprising a first element body comprising ZnO as the main component and also containing Co, and that the outer layer section have a region comprising a second element body comprising ZnO as the main component and also containing Co, with the content of the Co being lower than that in the first element body.

In this case, because the outer layer sections have a region comprising the second element body in which the content of Co serving as a material for developing the varistor characteristic is lower than that in the first element body, the potential formed on the crystal grain boundaries in the outer layer sections decreases. As a result, the relative dielectric constant of the outer layer sections becomes lower than the relative dielectric constant of the region where the pair of internal electrodes in the varistor layer overlap each other and the electrostatic capacitance of the outer layer sections can be decreased.

It is preferred that the region where the pair of internal electrodes in the varistor layer overlap each other have a region comprising a first element body comprising ZnO as the main component and also containing Co and a rare earth metal, and that the outer layer section have a region comprising a second element body comprising ZnO as the main component and also containing Co and a rare earth metal, with the contents of the Co and rare earth metal being lower than those in the first element body.

In this case, because the outer layer sections have a region comprising the second element body in which the content of Co and rare earth metal serving as materials for developing the varistor characteristic are lower than those in the first element body, the electric potential formed on the crystal grain boundaries in the outer layer sections decreases. As a result, the relative dielectric constant of the outer layer sections becomes lower than the relative dielectric constant of the region where the pair of internal electrodes in the varistor layer overlap each other and the electrostatic capacitance of the outer layer sections can be decreased.

It is preferred that the region where the pair of internal electrodes in said varistor layer overlap each other have a region comprising a first element body comprising ZnO as the main component and also containing Co and that the outer layer sections have a region comprising a second element body comprising ZnO as the main component and containing no Co.

In this case, because the outer layer sections contain no Co serving as a material for developing the varistor characteristic, the potential formed on the crystal grain boundaries in the outer layer sections becomes very small. As a result, the relative dielectric constant of the outer layer sections becomes much lower than the relative dielectric constant of the region where the pair of internal electrodes in the varistor layer overlap each other and the electrostatic capacitance of the outer layer sections can be decreased.

It is preferred that the region where the pair of internal electrodes in said varistor layer overlap each other have a region comprising a first element body comprising ZnO as the main component and also containing Co and a rare earth metal and that the outer layer sections have a region comprising a second element body comprising ZnO as the main component and containing no Co or rare earth metal.

In this case, because the outer layer sections contain no Co or rare earth metal serving as a material for developing the varistor characteristic, the potential formed on the crystal grain boundaries in the outer layer sections becomes very small. As a result, the relative dielectric constant of the outer layer sections becomes much lower than the relative dielectric constant of the region where the pair of internal electrodes in the varistor layer overlap each other and the electrostatic capacitance of the outer layer sections can be decreased.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a chart illustrating working examples 1 to 8 implemented with a multilayer chip varistor in accordance with the present invention and comparative examples 1 to 3.

DESCRIPTION OF THE PREFERRED EMBODIMENTS

The preferred embodiments of the present invention will be described below in detail with reference to the accompanying drawings. The same elements, or elements with the same function will be denoted by the same reference symbols in the description, without redundant description.

Figure 1:
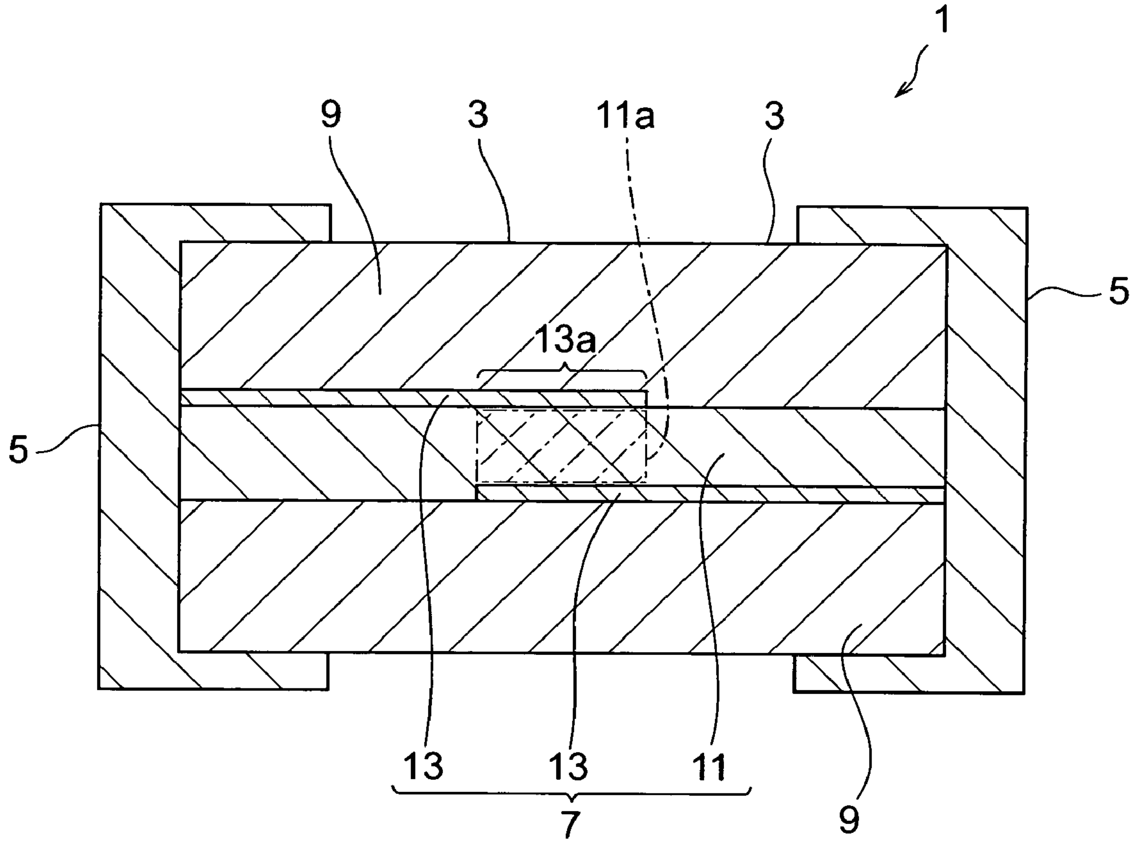
FIG. 1 is a view for explaining a sectional configuration of a multilayer chip varistor of the present embodiment.

First, referring to FIG. 1, a configuration of a multilayer chip varistor 1 according to the present embodiment will be described. FIG. 1 is a view for explaining a sectional configuration of a multilayer chip varistor of the present embodiment.

The multilayer chip varistor 1, as shown in FIG. 1, comprises a multilayer body 3 and a pair of external electrodes 5 formed on respective opposite end surfaces of the multilayer body 3. The multilayer body 3 has a varistor section 7 and a pair of outer layer sections 9 disposed so as to interpose the varistor section 7 and is configured by laminating the varistor section 7 and the pair of outer layer sections 9. The multilayer body 3 is in the form of a rectangular parallelepiped. For example, the length of the multilayer body 3 is set to 1.6 mm, the width thereof is set to 0.8 mm, and the height thereof is set to 0.8 mm. The multilayer chip varistor 1 of the present embodiment is the multilayer chip varistor of the so-called 1608 type.

The varistor section 7 comprises a varistor layer 11 for developing a varistor characteristic and a pair of internal electrodes 13 disposed so as to interpose the varistor layer 11. In the varistor section 7, the varistor layer 11 and the internal electrodes 13 are laminated alternately. A region 11*a* where the pair of internal electrodes 13 overlap in the varistor layer 11 functions as a region developing the varistor characteristic.

The varistor layer 11 is composed of a first element body comprising ZnO (zinc oxide) as the main component and also containing as additional components individual metals such as rare earth metal elements, Co, Group IIIb elements (B, Al, Ga, In), Si, Cr, Mo, alkali metal elements (K, Rb, Cs) and alkaline earth metal elements (Mg, Ca, Sr, Ba) or oxides thereof. In the present embodiment, the varistor layer 11 comprises Pr, Co, Cr, Ca, Si, K, Al, and the like as the additional components. As a result, the region 11*a* where the pair of internal electrodes 13 overlap in the varistor layer 11 has a region composed of a first element body comprising ZnO as the main component and also containing Co and Pr.

Pr and Co are the materials for developing the varistor characteristic. Pr is used because it has excellent voltage non-linearity and demonstrates small spread in characteristics in mass production. No specific limitation is placed on the content ratio of ZnO in the varistor layer 11, but usually it is 99.8–69.0 mass %, where the entire material constituting the varistor layer 11 is taken as 100 mass %. The thickness of the varistor layer 11 is, for example about 5–60 μm.

The pair of internal electrodes 13 are provided almost parallel to each other so that the end portions thereof are alternately exposed at the opposing end surfaces in the multilayer body 3. Each internal electrode 13 is electrically connected in the respective end portion thereof to the external electrodes 5. The internal electrodes 13 comprise an electrically conductive material. No specific limitation is placed on the electrically conductive material contained in the internal electrodes 13, but this material preferably comprises Pd or a Ag—Pd alloy. The thickness of the internal electrodes 13 is, for example, about 0.5–5 μm. When the multilayer chip varistor 1 of a low electrostatic capacity is to be obtained, the surface area of the portion 13*a* where the internal electrodes 13 overlap is usually 0.001–0.5 $mm^2$, preferably about 0.002–0.1 $mm^2$, as viewed from the lamination direction of the multilayer body 3.

The external electrodes 5 are provided so as to cover both end surfaces of the multilayer body 3. The external electrodes 5 are preferably from a metal material that can be readily connected electrically to the metal such as Pd that constitutes the internal electrodes 13. For example, Ag has good electric connectivity to the internal electrodes 13 composed of Pd. Moreover, it has good adhesivity to the end surfaces of the multilayer body 3. For those reasons, Ag is a preferred material for external electrodes. Such external electrodes 5 usually have a thickness of about 10–50 μm.

A Ni plated layer (not shown in the figure) with a thickness of about 0.5–2 μm and a Sn plated layer (not shown in the figure) with a thickness of about 2–6 μm are successively formed on the surface of the external electrodes 5 so as to cover the external electrodes 5. Those plated layers are formed mainly with the object of improving solder dip resistance and solder wettability when the multilayer chip varistor 1 is mounted on a substrate or the like by solder reflow.

The plated layers formed on the surface of the external electrodes 5 are not necessarily limited to the above-described combinations of materials, provided that the object of improving solder dip resistance and solder wettability is attained. For example, a Sn—Pb alloy can be used as another material that can constitute the plated layer and it can be advantageously used in combination with the above-described Ni or Sn. The plated layers are not necessarily limited to a two-layer structure and may have a structure comprising one or three and more layers.

The outer layer sections 9 are composed of a second element body comprising ZnO (zinc oxide) as the main component and also containing as additional components individual metals such as rare earth metal elements, Co, Group IIIb elements (B, Al, Ga, In), Si, Cr, Mo, alkali metal elements (K, Rb, Cs) and alkaline earth metal elements (Mg, Ca, Sr, Ba) or oxides thereof. In the present embodiment, outer layer sections 9 comprise Pr, Co, Cr, Ca, Si, K, Al, and the like as the additional components. The content of Co in the second element body is set lower than the content of Co in the first element body. As a result, the outer layer sections 9 have a region composed of a second element body that comprises ZnO as the main component and has a Co content lower than that in the first element body. The thickness of the outer layer sections 9 is, for example, about 0.3–0.38 μm.

Taking into account the development of varistor characteristic in the varistor layer 11 (region 11*a*), the content of Co in the first element body is preferably 0.1 mol % or higher per 100 mol % of the entire amount of zinc oxide and other metal atoms. Therefore, the content of Co in the second element body is preferably less than 0.1 mol % per 100 mol % of the entire amount of zinc oxide and other metal atoms. The content of Co in the second element body may be also zero, that is, the second element body may be free of Co.

As described hereinabove, with the present embodiment, because the outer layer sections 9 have a region composed of a second element body in which the content of Co serving as the material for developing the varistor characteristic is lower than that in the first element body, the potential formed on the crystal grain boundaries in the outer layer sections 9 decreases. Therefore, the relative dielectric constant of the outer layer sections 9 becomes lower than the relative dielectric constant of the region 11*a* in the varistor layer 11 where the pair of inner electrodes 13 overlap and the electrostatic capacitance of the outer layer sections 9 decreases. As a result, the electrostatic capacitance of the entire multilayer chip varistor 1 can be decreased. Furthermore, because the surface area of the portion where the internal electrodes 13 overlap each other can be set with consideration for ESD resistance, a good ESD resistance can be maintained in the multilayer chip varistor 1.

When the second element body contains no Co, the electric potential formed on crystal grain boundaries in the outer layer sections 9 becomes very small. Therefore, the relative dielectric constant of the outer layer sections 9 becomes much lower than the relative dielectric constant of the region 11*a* and the electrostatic capacitance of the outer layer sections 9 decreases. As a result, the electrostatic capacitance of the entire multilayer chip varistor 1 can be further decreased.

As a modification of the present embodiment, the content of Co in the second element body may be set lower than the content of Co in the first element body and the content of the rare earth metal (in the present embodiment, Pr) in the second element body may be set lower than the content of the rare earth metal in the first element body. In this case, the outer layer sections 9 have a region comprising a second element body that comprises ZnO as the main component and has the content of Co and the content of the rare earth metal lower than those in the first element body. The content of the rare earth metal in the second element body may be zero, that is, the second element body may be free of rare earth metals.

With consideration for the development of varistor characteristic in the varistor layer 11 (region 11*a*), the content of Pr in the first element body is preferably 0.05 mol % or higher per 100 mol % of the entire amount of zinc oxide and other metal atoms. Therefore, the content of Pr in the second element body is preferably less than 0.05 mol % per 100 mol % of the entire amount of zinc oxide and other metal atoms. Because the content of Pr is related to the content of Co, it is not necessarily limited to the above-described numerical range.

In the above-described modification example, the outer layer sections 9 have a region comprising a second element body in which the contents of Co and rare earth metal is less than those in the first element body. Therefore, the electric potential formed on the crystal grin boundaries in the outer layer sections 9 is less than that in the case where only the content of Co is less, as in the above-described embodiment. Thus, the relative dielectric constant of the outer layer sections 9 becomes less than the relative dielectric constant of the region 11*a* in the varistor layer 11 where the pair of internal electrodes 13 overlap each other. As a result, the electrostatic capacitance of the outer layer sections 9 further decreases and the electrostatic capacitance of the entire multilayer chip varistor 1 can be further decreased.

When the second element body contains no Co or rare earth metal, the electric potential formed on the crystal grain boundaries of the outer layer sections 9 becomes less than that obtained in the case when only Co is absent. Thus, the relative dielectric constant of the outer layer sections 9 becomes less than the relative dielectric constant of the region 11*a* in the varistor layer 11 where the pair of internal electrodes 13 overlap each other. As a result, the electrostatic capacitance of the outer layer sections 9 decreases substantially and the electrostatic capacitance of the multilayer chip varistor 1 is further decreased.

When the second element body comprises Co or when the second element body comprises Co and a rare earth metal, the difference in shrinkage ratio between the second element body and first element body is less than that in the case where the second element body contains no Co or when the second element body contains neither Co nor rare earth metal. Therefore, when the second element body comprises Co or when the second element body comprises Co and a rare earth metal, fluctuations in characteristics caused by residual stresses on boundary surfaces that are caused by the difference in shrinkage ratio between the second element body and first element body and also the occurrence of internal electrode peeling can be inhibited.

Figure 2:
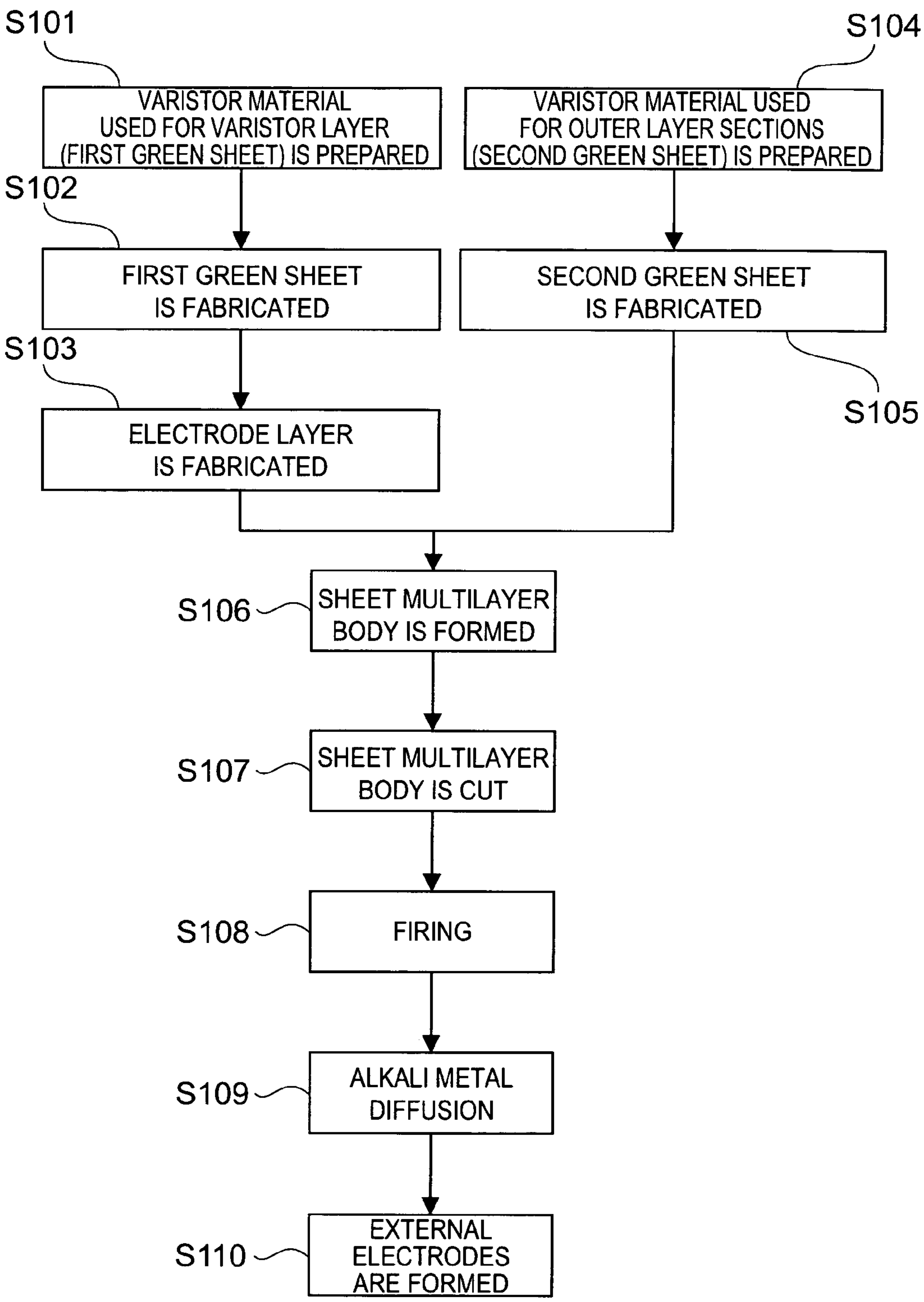
FIG. 2 is a flowchart for explaining the manufacturing process of the multilayer chip varistor of the present embodiment.
Figure 3:
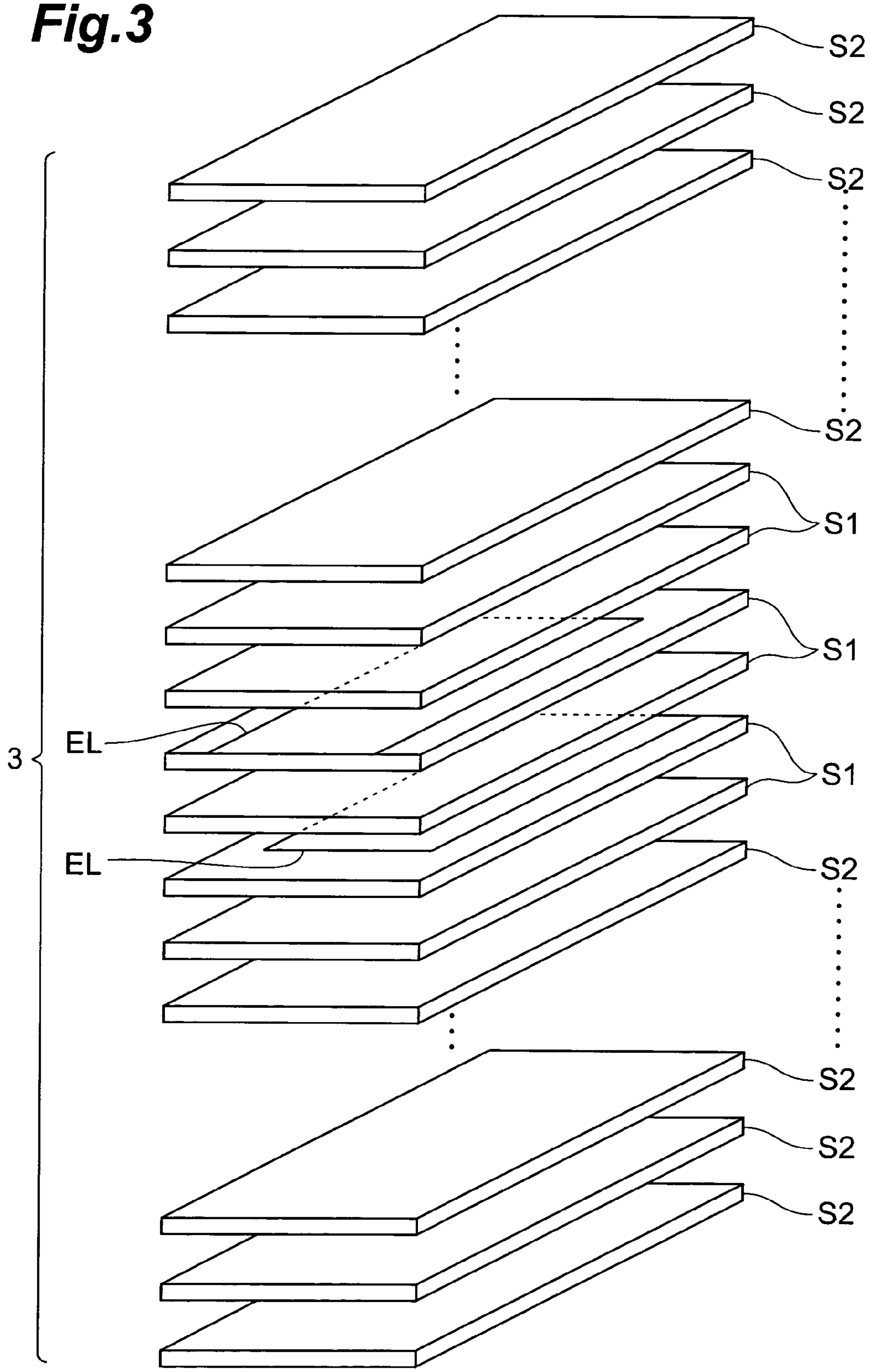
FIG. 3 is a view for explaining the manufacturing process of the multilayer chip varistor of the present embodiment.

The manufacturing process of the multilayer chip varistor 1 having the above-described structure will be explained hereinbelow with reference to FIGS. 1 to 3. FIG. 2 is a flowchart for explaining the manufacturing process of the multilayer chip varistor of the present embodiment. FIG. 3 is a view for explaining the manufacturing process of the multilayer chip varistor of the present embodiment.

First, ZnO, which is the main component constituting the varistor layer 11, and very small amounts of additives, for example, metals such as Pr, Co, Cr, Ca, Si, K, and Al or oxides thereof are weighed to obtain the prescribed ratio thereof. The components are then mixed and a varistor material is prepared (step S101). Then, an organic binder, an organic solvent, and an organic plasticizer are added to the varistor material and a slurry is obtained by mixing and grinding for 20 h by using a ball mill or the like.

The slurry is coated on a substrate, for example, from polyethylene terephthalate by a well-known method such as a doctor blade method. The coating is then dried to form a film with a thickness of about 30 μm. The film is peeled off the substrate to obtain a first green sheet (step S102).

Then, an electrically conductive paste, which is the material for the internal electrodes 13, is coated according to the prescribed pattern, for example, by a printing method such as a screen printing method on the first green sheet S1. The electrically conductive paste contains Pd for the electrically conductive material. Then, an electrode layer having the prescribed pattern is formed by drying the electrically conductive paste (step S103).

On the other hand, ZnO, which is the main component constituting the outer layer sections 9, and very small amounts of additives, for example, metals such as Pr, Co, Cr, Ca, Si, K, and Al or oxides thereof are weighed to obtain the prescribed ratio thereof. The components are then mixed and a varistor material is prepared (step S104). At this time, the content of Co is set lower that the content of Co in the preparation of the first green sheet. Furthermore, the content of Co may be zero. Then, an organic binder, an organic solvent, and an organic plasticizer are added to the varistor material and a slurry is obtained by mixing and grinding for about 20 h by using a ball mill or the like.

The slurry is coated on a substrate, for example, from polyethylene terephthalate by a well-known method such as a doctor blade method. The coating is then dried to form a film with a thickness of about 30 μm. The film is peeled off the substrate to obtain a second green sheet (step S105).

The first green sheet with an electrode layer formed thereon, the first green sheet where no electrode layer was formed, and the second green sheet are then laminated in the prescribed order to form a sheet multilayer body (step S106). The sheet multilayer body is cut to the desired size to obtain a green chip (step S107). In the green chip, as shown in FIG. 3, sheets S1, S2 are stacked in the order as follows: a plurality of second green sheets S2, first green sheet S1, two first green sheets S1 with an electrode layer EL formed thereon, first green sheet S1, two first green sheets S1 with an electrode layer EL formed thereon, a plurality of first green sheets S1, and a plurality of second green sheets S2. It is not always necessary to laminate the first green sheet S1 where the electrode layer E1 was not formed.

The binder is then removed by heating of the green chip. The heating temperature is 180–400° C. and the heating time is about 0.5–24 h. Then, the green chip is fired (step S108) and a multilayer body 3 is obtained. The firing temperature is 1000–1400° C. and the firing time is about 0.5–8 h. As a result of this firing, the first green sheet S1 located between the electrode layers EL in the green chip becomes the varistor layer 11 and the second green sheets S2 become the outer layer sections 9. The electrode layers EL become the internal electrodes 13. The element surface of the multilayer body 3 may be subjected to smoothing by introducing into a polishing container with a polishing material prior to carrying out the subsequent processes.

Then, alkali metals (for example, Li and Na) are caused to diffuse from the surface of the multilayer body 3 (step S109). Here, first, an alkali metal compound is caused to adhere to the surface of the laminated body 3 obtained. A sealed rotary pot can be used for the adhesion of the alkali metal compound. No specific limitation is placed on the alkali metal compound, but in the preferred compound, an alkali metal can diffuse from the surface of the multilayer body 3 to the vicinity of the internal electrodes 13 under heat treatment. For example, oxides, hydroxides, chlorides, nitrates, borates, carbonates, and oxalates of alkali metals can be used.

The multilayer body 3 with the alkali metal compound adhered thereto is heat treated for the prescribed time and at the prescribed temperature in an electric furnace. As a result, an alkali metal diffuses from the alkali metal compound from the surface of the multilayer body 3 to the vicinity of the internal electrodes 13. The preferred heat treatment temperature is 700–1000° C., and the heat treatment atmosphere is air. The heat treatment item (holding time) is preferably 10 min to 4 h.

Then, a pair of external electrodes 5 are formed (step S110). Here, first, a paste for external electrodes mainly comprising Ag is coated on both end portions of the multilayer body 3 so as to be in contact with the pair of internal electrodes 13. Then, the coated paste is heated (baked) at a temperature of about 550–850° C. As a result, external electrodes 5 comprising Ag are formed. A Ni plated layer and a Sn plated layer are then successively laminated by electroplating or the like on the outer surface of the external electrodes 5. The multilayer chip varistor 1 is thus obtained.

As described hereinabove, with the present embodiment, the outer layer sections 9 are formed from the second green sheet S2 with a Co content lower than that in the first green sheet S1. Therefore, the outer layer sections 9 with a decreased electric potential formed on crystal grain boundaries is obtained. As a result, the multilayer chip varistor 1 with decrease electrostatic capacitance can be obtained. Because the surface area of the portion where the internal electrodes 13 overlap each other obviously can be set with consideration for ESD resistance, the multilayer chip varistor 1 thus obtained maintains good ESD resistance.

When the second green sheet S2 contains no Co, the electric potential formed on the crystal grain boundaries in the outer layer sections 9 becomes very small and the multilayer chip varistor 1 with even lower electrostatic capacitance can be obtained.

As a modification of the present embodiment, the content of Co in the second green sheet S2 may be set lower than the content of Co in the first green sheet S1 and the content of the rare earth metal (in the present embodiment, Pr) in the second green sheet S2 may be set lower than the content of the rare earth metal in the first green sheet S1. The content of the rare earth metal in the second green sheet S2 may be zero, that is, the second green sheet S2 may be free of rare earth metals.

In the above-described modification example, the outer layer sections 9 are formed from the second green sheets S2 with a content of Co and rare earth metal lower than those in the first green sheets S1. Therefore, the electric potential formed on the crystal grain boundaries in the outer layer sections 9 is lower than that obtained in the case where only the content of Co is decreased, as in the above-described embodiment. Thus, the relative dielectric constant of the outer layer sections 9 becomes lower than the relative dielectric constant of the varistor layer 11. As a result, the multilayer chip varistor 1 with a further decreased electrostatic capacitance can be obtained.

When the second green sheet S2 contains neither Co nor a rare earth metal, the electric potential formed on the crystal grain boundaries in the outer layer sections 9 is lower than that obtained when only Co is not contained. Therefore, the relative dielectric constant of the outer layer sections 9 becomes lower than the relative dielectric constant of the varistor layer 11. As a result, the multilayer chip varistor 1 with a very low electrostatic capacitance can be obtained.

The preferred embodiments of the present invention were explained above, but the present invention is not necessarily limited to those embodiments. For example, the above-described multilayer chip varistor 1 had a structure in which the varistor layer 11 was interposed between a pair of internal electrodes 13, but the varistor in accordance with the present invention may be also a multilayer chip varistor in which a plurality of such structures are stacked. With such a multilayer varistor, electrostatic resistance can be additionally increased and the drive with even lower voltage is possible.

In the above-described multilayer chip varistor 1, the entire varistor layer 11 was composed of the first element body comprising ZnO as the main component and also containing Co and Pr, but this configuration is not limiting. The region 11*a* overlapping the pair of internal electrodes 13 in the varistor layer 11 may also locally have a region composed of the first element body. The entire outer layer section 9 was composed of the second element body comprising ZnO as the main component and having a Co content lower than that in the first element body, but this configuration is not limiting. The outer layer sections 9 may also locally have a region composed of the second element body.

With the above-described manufacturing method, two electrode layers EL were formed on the first green sheets S1, but this configuration is not limiting. One electrode layer EL may be formed on the second green sheets S2. Alternatively, two electrode layers EL may be formed on the second green sheets S2 and those sheets S1, S2 may be laminated so that the first green sheets S1 are interposed between the second green sheets S2.

The present invention will be described below in greater detail based on working examples thereof, but the present invention is not limited to those working examples.

WORKING EXAMPLE 1

A varistor material to be used for the varistor layer (first green sheet) was prepared by adding Pr (0.5 mol %), Co (1.5 mol %), Al (0.005 mol %), K (0.05 mol %), Cr (0.1 mol %), Ca (0.1 mol %), and Si (0.02 mol %) to ZnO (97.725%) with a purity of 99.9%. The varistor material to be used for the outer layer section (second green sheet) was prepared by adding Pr (0.5 mol %), Co (0.05 mol %), Al (0.005 mol %), K (0.05 mol %), Cr (0.1 mol %), Ca (0.1 mol %), and Si (0.02 mol %) to ZnO (99.175 mol %) with a purity of 99.9%. Also, electrically conductive paste for forming internal electrodes was prepared by mixing metal powder comprising Pd particles, organic binder, and organic solvent.

A multilayer chip varistor of a 1608 type was manufactured following the manufacturing process represented in FIG. 2 by using the above-described varistor material and electrically conductive paste. The surface area of the overlapping portions of the internal electrodes was set to 0.05 $mm^2$.

As for the alkali metal diffusion treatment, the multilayer bodies (sintered bodies) thus obtained were placed into a sealed rotary pot together with a $Li_2$ $CO_3$ powder (mean particle size 3 μm) serving as an alkali metal compound and mixing was conducted to cause the adhesion of 1 μg $Li_2CO_3$ powder per one multilayer body 1. The amount of the $Li_2CO_3$ powder loaded into the sealed rotary pot was within a range of 0.01 μg to 10 mg per one multilayer body 1. The heat treatment temperature was 900° C. and the heat treatment time was 10 min.

WORKING EXAMPLES 2 AND 3

Multilayer chip varistors of Working Examples 2 and 3 were obtained in the same manner as in Working Example 1, except that the amount of added Co in the varistor material used for the external outer sections (second green sheet) was set to 0.01 mol % and zero. Because the amount of added Co was changed with respect to that of Working Example 1, the amount of ZnO in Working Examples 2 and 3 was adjusted to obtain a total amount of ZnO and other metal atoms of 100 mol %.

WORKING EXAMPLES 4 TO 7

Multilayer chip varistors of Working Examples 4 to 7 were obtained in the same manner as in Working Example 1, except that the amount of added Pr in the varistor material used for the external outer sections (second green sheet) was set to 0.05 mol %, 0.01 mol %, 0.005 mol %, and zero. Because the amount of added Pr was changed with respect to that of Working Example 1, the amount of ZnO in Working Examples 4 to 7 was adjusted to obtain a total amount of ZnO and other metal atoms of 100 mol %.

WORKING EXAMPLE 8

A multilayer chip varistor of Working Example 8 was obtained in the same manner as in Working Example 1, except that the amount of added Co and the amount of added Pt in the varistor material used for the external outer sections (second green sheet) were set to zero. Because the amounts of added Co and Pr were changed with respect to those of Working Example 1, the amount of ZnO in Working Example 8 was adjusted to obtain a total amount of ZnO and other metal atoms of 100 mol %.

COMPARATIVE EXAMPLE 1

A multilayer chip varistor of Comparative Example 1 was obtained in the same manner as in Working Example 1, except for the following. The amount of added Co in the varistor material used for the external outer sections (second green sheet) was set to 1.5 mol %. Thus, the varistor material used for the external outer sections (second green sheet) and the varistor material used for the varistor layer (first green sheet) were identical. No adhesion of the $Li_2CO_3$ powder was induced. Thus, Li was not caused to diffuse into the multilayer body.

COMPARATIVE EXAMPLE 2

A multilayer chip varistor of Comparative Example 2 was obtained in the same manner as in Working Example 1, except for the following. The amount of added Co in the varistor material used for the external outer sections (second green sheet) was set to 1.5 mol %. Thus, the varistor material used for the external outer sections (second green sheet) and the varistor material used for the varistor layer (first green sheet) were identical. No adhesion of the $Li_2CO_3$ powder was induced. Thus, Li was not caused to diffuse into the multilayer body. The surface area of the overlapping portions of the internal electrodes was set to 0.025 $mm^2$.

COMPARATIVE EXAMPLE 3

A multilayer chip varistor of Comparative Example 3 was obtained in the same manner as in Working Example 1, except for the following. The amount of added Co in the varistor material used for the external outer sections (second green sheet) was set to 1.5 mol %. Thus, the varistor material used for the external outer sections (second green sheet) and the varistor material used for the varistor layer (first green sheet) were identical. Because the amount of added Co was changed with respect to that of Working Example 1, the amount of ZnO in Comparative Examples 1 to 3 was adjusted to obtain a total amount of ZnO and other metal atoms of 100 mol %.

The relative dielectric constant $\epsilon A$ of the region overlapping the pair of internal electrodes in the varistor layer, relative dielectric constant $\epsilon B$ of the outer layer sections, nonlinear coefficient $\alpha$, electrostatic capacitance C, and ESD resistance were measured for each of the obtained multilayer chip varistors. The ratio ($\epsilon A/\epsilon B$) of the relative dielectric constant $\epsilon A$ and relative dielectric constant $\epsilon B$ was then calculated. The results are represented in FIG. 4.

The relative dielectric constant $\epsilon B$ is found in the manner as follows. First, external electrodes are formed to obtain a surface area $S_B$ and the distance from the internal electrodes of $d_B$ and the electrostatic capacitance $C_B$ is measured. Then, the relative dielectric constant $\epsilon B$ is found from the following formula (2).

$$\epsilon B=C_B*d_B/(\epsilon_0*S_B) \quad (2)$$

The relative dielectric constant $\epsilon A$ is found in the manner as follows. First, the electrostatic capacitance C of the fabricated multilayer chip varistors is measured. Then, the relative dielectric constant $\epsilon A$ is found from the following formula (3).

$$\epsilon A=(C-C_B)*d_A/(\epsilon_0*S_A) \quad (3)$$

$d_A$: spacing of internal electrodes $S_A$: surface area of overlapping portion of internal electrodes The nonlinear coefficient $\alpha$ represents the relationship between the voltage applied between the electrodes of a multilayer chip varistor and the electric current when the electric current flowing in the multilayer chip varistor changes from 1 mA to 10 mA. The nonlinear coefficient $\alpha$ was found from the following formula (4)

$$\alpha=\log(I_{10}/I_1)/\log(V_{10}/V_1) \quad (4)$$

$V_{10}$ means the varistor voltage obtained when an electric current of $I_{10}$=10 mA was flowing in the multilayer chip varistor. $V_1$ means the varistor voltage obtained when an electric current of $I_1$=1 mA was flowing in the multilayer chip varistor. The larger is the nonlinear coefficient $\alpha$, the better is the varistor characteristic.

Electrostatic capacitance C is the electrostatic capacitance at 1 MHz; it was measured with Precision LCR Meter (manufactured by Hewlett Packard Co., 4284A). In the present examples, when the electrostatic capacitance C was 2.0 pF or less, the electrostatic capacitance of the multilayer chip varistor was judged to be sufficiently low and was evaluated as "good (O)". The level of 2.0 pF or less was selected as a judgment criterion because, if the electrostatic capacitance of the multilayer chip varistor is 2.0 pF or less, it is suitable for a high frequency of 100 MHz or higher.

ESD resistance was measured by an Electrostatic Discharge Immunity Test stipulated by the standard IEC61000-4-2 of the IEC (International Electro technical Commission). In the present working examples, when the ESD resistance was 8.0 kV or higher, the ESD resistance was judged to be sufficient and was evaluated as "good (O)". The level of 8.0 kV or higher was selected as a judgment criterion because it satisfied the Level 4 of the IEC610004-2.

In the multilayer chip varistors of Working Examples 1 to 8, the electrostatic capacitance C was 2.0 pF or lower and the ESD resistance was 8 kV or higher. By contrast, in the multilayer chip varistors of Comparative Examples 1 and 3, when the ESD resistance was 8 kV or higher, the electrostatic capacitance C was higher than 2.0 pF. In the multilayer chip varistors of Comparative Examples 1 and 3, when the electrostatic capacitance C was 2.0 pF or lower, the ESD resistance was less than 8 kV. The above-described results confirmed the efficiency of the present invention.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer chip varistor comprising:

a multilayer body having a varistor section comprising a varistor layer developing a voltage nonlinear characteristic, a pair of internal electrodes disposed so as to interpose said varistor layer, and a pair of outer layer sections disposed so as to interpose said varistor section; and a pair of external electrodes formed on said multilayer body and connected to respective electrodes of said pair of internal electrodes, wherein the relative dielectric constant of said outer layer sections is set lower than the relative dielectric constant of the region where said pair of internal electrodes in said varistor layer overlap each other, wherein the region where said pair of internal electrodes in said varistor layer overlap each other has a region comprising a first element body comprising ZnO as the main component and also containing Co, and wherein said outer layer sections have a region comprising a second element body comprising ZnO as the main component and also containing Co, with the content of said Co being lower than that in said first element body.

2. A multilayer chip varistor comprising:

a multilayer body having a varistor section comprising a varistor layer developing a voltage nonlinear characteristic, a pair of internal electrodes disposed so as to interpose said varistor layer, and a pair of outer layer sections disposed so as to interpose said varistor section; and a pair of external electrodes formed on said multilayer body and connected to respective electrodes of said pair of internal electrodes, wherein the relative dielectric constant of said outer layer sections is set lower than the relative dielectric constant of the region where said pair of internal electrodes in said varistor layer overlap each other, wherein the region where said pair of internal electrodes in said varistor layer overlap each other has a region comprising a first element body comprising ZnO as the main component and also containing Co and a rare earth metal, and wherein said outer layer sections have a region comprising a second element body comprising ZnO as the main component and also containing Co and a rare earth metal, with the contents of said Co and said rare earth metal being lower than those in said first element body.

3. A multilayer chip varistor comprising:

a multilayer body having a varistor section comprising a varistor layer developing a voltage nonlinear characteristic, a pair of internal electrodes disposed so as to interpose said varistor layer, and a pair of outer layer sections disposed so as to interpose said varistor section; and a pair of external electrodes formed on said multilayer body and connected to respective electrodes of said pair of internal electrodes, wherein the relative dielectric constant of said outer layer sections is set lower than the relative dielectric constant of the region where said pair of internal electrodes in said varistor layer overlap each other, wherein the region where said pair of internal electrodes in said varistor layer overlap each other has a region comprising a first element body comprising ZnO as the main component and also containing Co, and wherein said outer layer sections have a region comprising a second element body comprising ZnO as the main component and containing no Co.

4. A multilayer chip varistor comprising:

a multilayer body having a varistor section comprising a varistor layer developing a voltage nonlinear characteristic, a pair of internal electrodes disposed so as to interpose said varistor layer, and a pair of outer layer sections disposed so as to interpose said varistor section; and a pair of external electrodes formed on said multilayer body and connected to respective electrodes of said pair of internal electrodes, wherein the relative dielectric constant of said outer layer sections is set lower than the relative dielectric constant of the region where said pair of internal electrodes in said varistor layer overlap each other, wherein the region where said pair of internal electrodes in said varistor layer overlap each other has a region comprising a first element body comprising ZnO as the main component and also containing Co and a rare earth metal, and wherein said outer layer sections have a region comprising a second element body comprising ZnO as the main component and containing no Co or rare earth metal.

* * * * *